Aug. 15, 1961   V. E. HACKING   2,995,794
TOGGLE CLAMP
Filed July 20, 1959
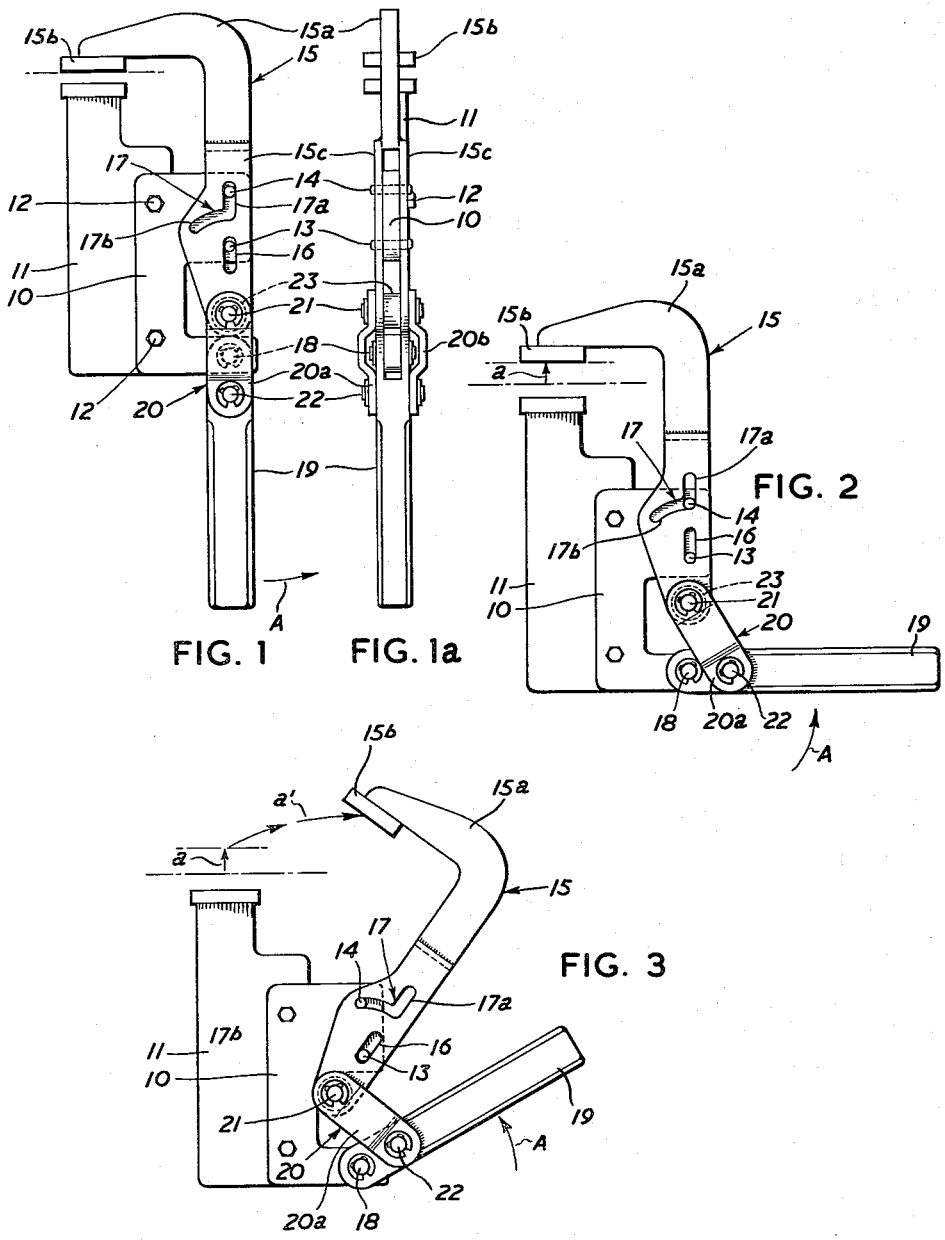
INVENTOR
VERNON E. HACKING
BY Maybee & Legris
ATTORNEYS

United States Patent Office 2,995,794
Patented Aug. 15, 1961

2,995,794
TOGGLE CLAMP
Vernon Edward Hacking, 242 Birmingham St.,
New Toronto, Ontario, Canada
Filed July 20, 1959, Ser. No. 828,322
3 Claims. (Cl. 24—248)

The object of this invention is to provide a toggle clamp in which a movable clamping member approaches its clamping position in a direction which is truly perpendicular to a fixed clamping member or anvil, and which, when actuated to the release position, will initially retreat from the fixed clamping member or anvil in a direction which is truly rectilinear and which will subsequently swing in an arcuate path to a position in which it is clear of the fixed clamping member or anvil.

To accomplish this object structure is provided which includes a fixed member, a movable clamping member, a first pin carried by the fixed member and extending through a rectilinear slot in the movable clamping member, a second pin axially parallel to the first pin and carried by the fixed member, the second pin extending through another slot in the movable clamping member which slot includes a rectilinear portion extending parallel to said rectilinear slot and an arcuate portion of a radius taken about the axis of the first pin which is not greater than the distance between the axes of the two pins, the rectilinear slot being of sufficient extent to permit the second pin to enter the arcuate portion of said another slot when the movable clamping member is moved in one direction and to permit the second pin to enter the rectilinear portion of said another slot when the movable clamping member is moved in an opposite direction, a lever pivotally mounted on the fixed member for swinging movement about an axis parallel to the axes of the pins, and a link pivotally connected to the movable clamping member and to the lever at a position spaced from the pivotal axis of the lever, the movable clamping member, lever and link in combination providing an overset toggle.

According to a preferred construction the pivotal axis of the lever and the axis of the pins are arranged for them to lie in a common plane with the axis of the first pin intermediate the axis of the second pin and the pivotal axis of the lever.

Further objects and advantages of the invention will become apparent from a study of the following specification when taken in conjunction with the accompanying drawings in which—

FIGURE 1 is a front elevation of the toggle clamp according to the invention, with a clamp shown in a clamping position;

FIGURE 1a is a side elevation of the clamp taken from the right of FIGURE 1;

FIGURE 2 is a side elevation corresponding to FIGURE 1, but showing the clamp in an intermediate position of actuation; and, FIGURE 3 is a side elevation corresponding to FIGURE 1, but showing the clamp in an extreme position of actuation.

The clamp of the invention includes a fixed member 10 which is secured to an anvil or other stationary structure 11 by means of bolts 12, the fixed member 10 being of generally C-shape.

One arm of the member 10 carries a pair of pins 13, 14 which are arranged with their axes parallel. The pin 13, hereinafter referred to as a first pin, extends through a rectilinear slot 16 in a movable clamping member 15, and the pin 14, hereinafter referred to as a second pin, extends through a slot 17 in the member 15, which slot includes a rectilinear portion 17a which extends parallel and in line with the rectilinear slot 16, and an arcuate portion 17b which is of a radius taken about the axis of the pin 13 which is not greater than the distance between the axes of the two pins 13, 14. The slot 16 is of a length sufficient to permit the pin 14 to enter the arcuate portion 17b of the slot 17 when the member 15 is in one extreme position of longitudinal adjustment, and to permit the pin 14 to traverse the rectilinear portion 17a of the slot 17 when the member 15 is moved away from that position of adjustment.

The movable clamping member 15 is provided by a right angled arm 15a, which optionally carries a clamping plate or other work engaging device 15b, and a pair of plates 15c which are welded to either side of the arm 15a to provide a yoke which embraces the said one arm of the C-shaped member 10, the members 15c each being provided with the slots 16 and 17 through which the pins 13 and 14 extend on each lateral side of the member 10.

The other arm of the member 10 carries a pivot 18 on which the forked end of a lever 19 is journalled for swinging movement. The lever is connected to the adjacent end of the movable clamping member 15 by a link 20 comprised by a pair of plates 20a, 20b (see FIGURE 1a) which is pivotally connected at one end to the movable clamping member 15 by means of a pivot pin 21, and which is pivotally connected to the lever 19 at a position spaced from the pivot 18 by means of a pivot 22. Preferably a spacer is provided between the two arms 15c in the form of a sleeve 23 surrounding the pivot 21.

The operation of the toggle clamp is as follows:

Starting with the members of the clamp in the clamping position shown in FIGURES 1 and 1a, if the lever 19 is moved in the direction of the arrow A the pivot 22 will move in an arcuate path about the pivot 18, and the distance between the pivot 22 and the pins 13 and 14 will become progressively less. As this occurs, the link 20 will rotate about its respective pivots 21, 22, and will act to force the movable clamping member 15 in an upward direction, the movable clamping member being guided for rectilinear movement by the engagement of the pins 13 and 14 in the rectilinear slot 16 and rectilinear portion 17a of the slot 17 respectively.

In this manner the movable clamping plate 15b is caused to retreat from the anvil 11 in a direction a which is truly rectilinear.

Continued movement of the lever 19 in the direction of the arrow A beyond the position shown in FIGURE 2 causes the distance between the pivot 22 and the pins 13 and 14 to still further decrease. However, at this time the pin 13 is at one end of the rectilinear slot 16 and the pin 14 is at the corresponding end of the rectilinear portion 17a of the slot 17, and the only movement of the clamping member 15 which can take place is a pivotal movement about the axis of the pin 13, which movement is permitted by the arcuate portion 17b of the slot 17 and which is effected by the lateral pressure exerted on the clamping member 15 by the link 20, the movable clamping member 15 at this time moving in the arcuate path a1.

Reverse movement of the lever 19 causes the movable clamping member initially to retrace the path a1 until such time as the rectilinear portion 17a of the slot 17 is aligned with the pin 14, subsequent to which the movable clamping member will retrace the path a and will approach the anvil until such time as the pivots 18, 21 and 22 lie in a common plane, which plane also includes the axes of the pins 14 and 13.

Obviously by a simple re-organization of the structure hereinbefore described various other clamps may be constructed which operate in the manner described. For example, whereas the lever 19 and link 20 have been shown at the lower end of the movable clamping member 15 in the drawing it could equally well be arranged to act on the upper end of that member. Also, the slot 16 and the rectilinear portion 17a of the slot 17 need not be arranged in line as shown, but may be arranged laterally staggered but parallel to each other.

What I claim as my invention is:

1. A toggle clamp, including a fixed member having opposed parallel planar surfaces, a movable clamping member formed as a yoke including a pair of spaced parallel arms having mutually presented parallel planar surfaces which embrace at least a portion of the planar surfaces of the fixed member, a first pin carried by the fixed member and extending through a rectilinear slot in each arm of the movable clamping member, the rectilinear slots being in alignment, a second pin axially parallel to the first pin and carried by the fixed member, the second pin extending through another slot in each arm of the movable clamping member, said another slot being in alignment and including a rectilinear portion and an arcuate portion, the rectilinear portions extending parallel to said rectilinear slots and being oriented for the second and first pins to be traversed longitudinally of said rectilinear portions and rectilinear slots, respectively, as the movable member is moved in one direction, the rectilinear slots being of a length such that when the first pin is spaced from one end of those slots, the second pin is within the rectilinear portions, and when the first pin is at said one end the second pin is at the transition of the rectilinear and arcuate portions for that end to provide a fulcrum for arcuate swinging movement of the movable member about the axis of the first pin, the arcuate portions being of a radius which is not greater than the distance between the axes of the two pins, a lever pivotally mounted on the fixed member for swinging movement about an axis parallel to the axes of the pins, and a link pivotally connected to the movable clamping member at a position intermediate the axis of the first pin and the pivotal axis of the lever and pivotally connected to the lever at a position spaced from the pivotal axis of the lever, the movable clamping member, lever and link in combination providing an overset toggle.

2. A toggle clamp according to claim 1, in which the pivotal axis of the lever and the axes of the pins lie in a common plane.

3. A toggle clamp according to claim 1, in which the pivotal axis of the lever and the axes of the pins lie in a common plane with the axis of the first pin intermediate the axis of the second pin and the pivotal axis of the lever.

References Cited in the file of this patent

UNITED STATES PATENTS

| | | |
|---|---|---|
| 566,831 | Williard | Sept. 1, 1896 |
| 2,165,322 | Weston | July 11, 1939 |
| 2,427,603 | Higgins | Sept. 16, 1947 |
| 2,481,435 | Meunier | Sept. 6, 1949 |
| 2,574,281 | Olson | Nov. 6, 1951 |

FOREIGN PATENTS

| | | |
|---|---|---|
| 712,498 | Great Britain | July 28, 1954 |